United States Patent

[11] 3,631,660

[72] Inventors William E. Rickel
 Box 404;
 Thomas B. Oustad; Tommie B. Harper,
 both of Box 159, all of Munday, Tex. 76371
[21] Appl. No. 60,455
[22] Filed Aug. 3, 1970
[45] Patented Jan. 4, 1972

[54] ATTACHMENT FOR COTTON STRIPPER ROW UNIT TO MAINTAIN THE UNIT IN A PREDETERMINED BALANCED RELATION
7 Claims, 9 Drawing Figs.
[52] U.S. Cl. .................................................. 56/15.9, 56/33
[51] Int. Cl. ........................................................ A01d 45/20
[50] Field of Search ......................................... 56/15.9, 163, 33–35, 208, 14.9, DIG. 10

[56] References Cited
UNITED STATES PATENTS
2,533,510  12/1950  Roscoe ........................ 56/33
2,677,226  5/1954   Hyman ......................... 56/33 X
2,830,425  4/1958   Stansfield ..................... 56/35

*Primary Examiner*—Louis G. Mancene
*Assistant Examiner*—J. A. Oliff
*Attorney*—Wayland D. Keith ABSTRACT: A spring-tensioned, counterbalancing arrangement which is used in conjunction with angulated ground-engaging shoes on a cotton stripper so as to maintain the cotton stripper row unit in light contact relation with the surface of the terrain to enable the cotton stalks to be lifted and guided between the adjacent sides of the respective cotton stripper row units. This enables the picking up of the branches of the cotton stalk, thereby greatly increasing the recovery of cotton. The present arrangement enables the cotton stripper row unit to be adjusted with a counterbalancing spring so the shoes thereof will glide lightly on the surface of the terrain so the angularity of the shoes will cause upward movement over any obstructions. By having the lever to which the spring attaches jointed and pivotally mounted enables the cotton stripper row unit to individually move upward or downward without manual attention, however, they can both be raised with the lift mechanism, when desired.

WILLIAM E. RICKEL
THOMAS B. OUSTAD
TOMMIE B. HARPER
INVENTOR.

BY

Wayland D. Keith
THEIR AGENT

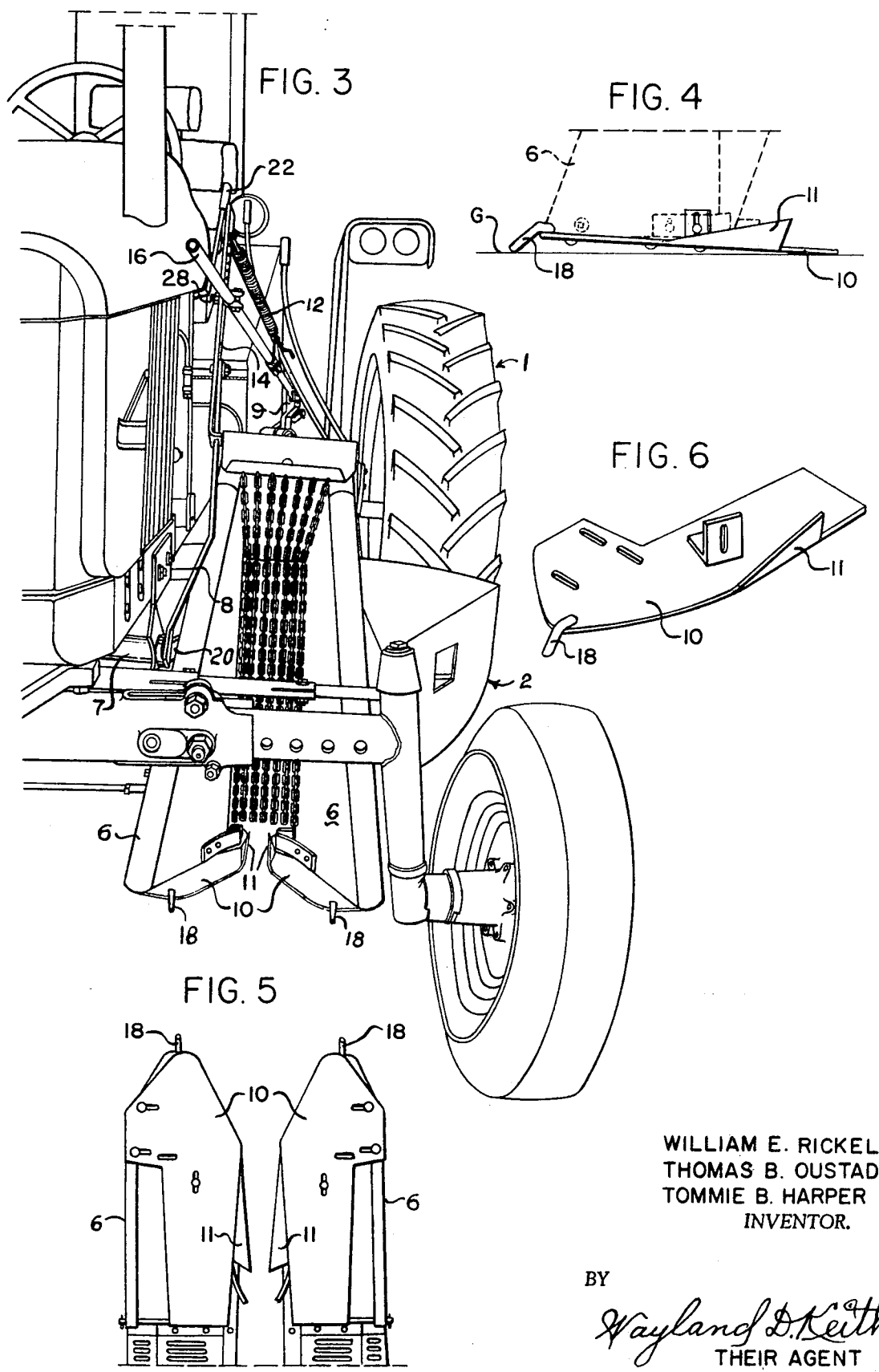

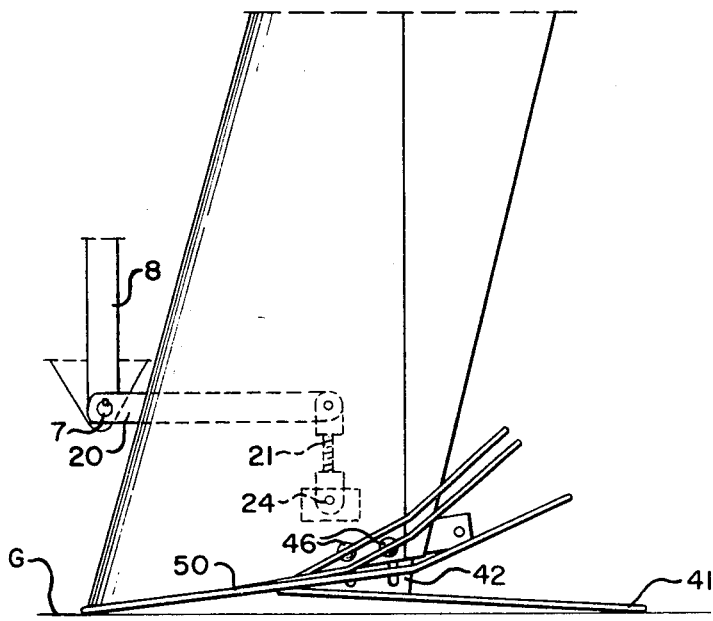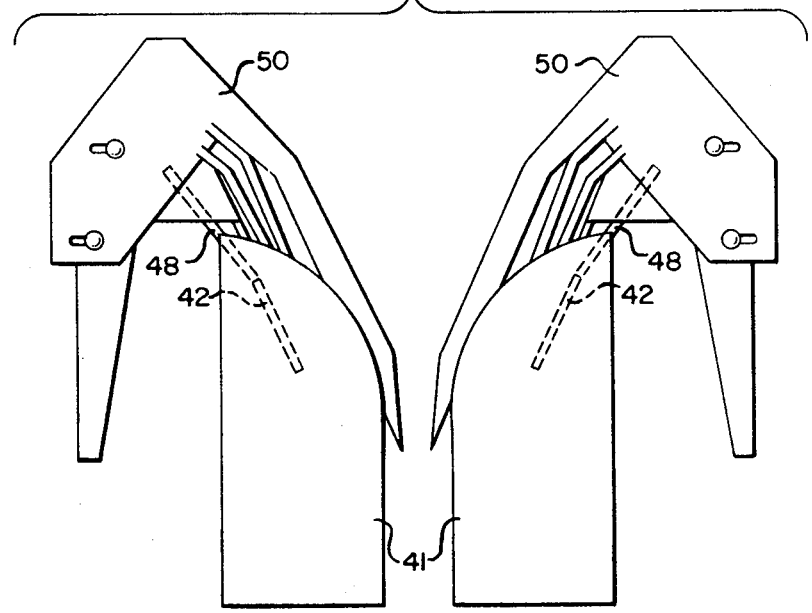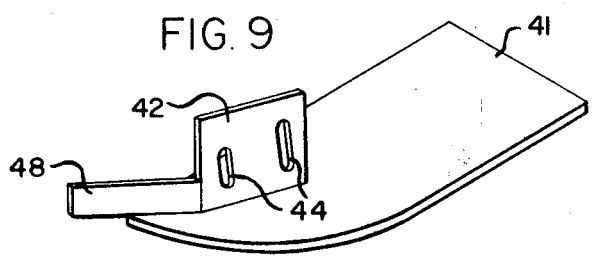

ATTACHMENT FOR COTTON STRIPPER ROW UNIT TO MAINTAIN THE UNIT IN A PREDETERMINED BALANCED RELATION

This invention relates to an attachment for a cotton stripper, and more particularly to an attachment whereby the cotton stripper will "float" or "glide" over the ground without digging into the ground, and without being raised above the ground too high to do a proper job of stripping the bolls from cotton stalks.

Various adjustments for cotton strippers have been proposed heretofore, but these, for the most part, had to be continuously manually regulated to obtain the proper operational relation between the cotton stripper and the cotton bolls being stripped.

The present invention is so designed as to attach to any cotton stripper in general use, which is mounted on a tractor, and it operates in conjunction with the hydraulic system of the tractor on which it is mounted.

OBJECTS OF THE INVENTION

An object of the invention is to provide a device which will permit the surface of the ground to control the relation of the lower portion of the cotton stripper mechanism in the proper relation to the cotton stalks bearing the cotton bolls to be stripped therefrom.

Another object of the invention is to provide an adjustable, tensioned spring arrangement to maintain the cotton stripper row unit in substantially balanced relation so it may be readily raised or lowered in accordance with the position of a ground-engaging shoe on the cotton stripper row unit.

Still another object of the invention is to provide, for a cotton stripper, a ground-engaging shoe which will glide along the surface of the ground and pick up any fallen cotton stalks and direct these into the cotton stripper row unit.

With these objects in mind and others which will become manifest as the description proceeds, reference is to be had to the accompanying drawings in which like reference characters designate like parts in the several views thereof, in which:

FIG. 3 is a fragmentary, front elevational, perspective view of a tractor showing a cotton stripper thereon, showing the ground engaging plates on the lower side thereof, and showing the tensioning means associated with the cotton stripping row unit to compensate for balancing of the weight thereof;

FIG. 4 is a fragmentary, side elevational view of the lower side of the cotton stripper row unit, showing one form of ground-engaging plate or shoe thereon, which is mounted on the lower side of the cotton stripper row unit at an angle, to enable the cotton stripper row unit to glide over the ground when the weight thereof is properly compensated by tensioning springs;

FIG. 5 is a bottom plan view of the ground-engaging plates or shoes on the lower side of the cotton stripper row unit, showing a hinge pin to permit the hinging of the ground-engaging plates with respect to the cotton stripper row unit body;

FIG. 6 is a perspective view of the ground-engaging plate or shoe, such as used in compact soil, removed from the cotton stripper row unit, showing the slotted opening which enables the ground-engaging plate or shoe to be attached to various models of cotton stripper row units;

FIG. 7 is a fragmentary side elevational view of the lower portion of the cotton stripper row unit, showing a second form of ground-engaging plate or shoe thereon;

FIG. 8 is a bottom plan view of the second form of ground-engaging plate for use in sandy or soft soil; and FIG. 9 is a view similar to FIG. 6, but of the second form of ground-engaging plate or shoe.

Figure 1:
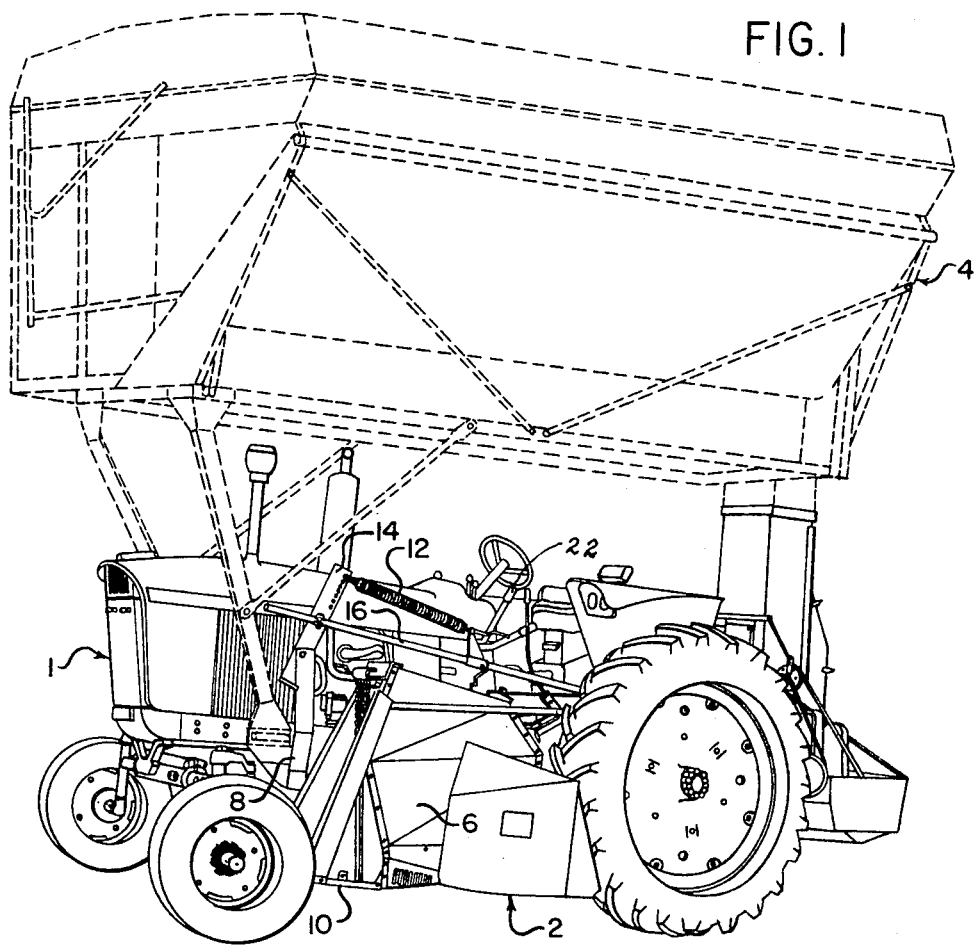
FIG. 1 is a perspective view of a cotton boll stripper mounted on a tractor, showing the attachment thereon, which attachment compensates for the weight of the stripper row units to enable the stripper row units to be guided over the terrain without digging into the terrain, the cotton-receiving compartment being shown in dashed outline as positioned above the tractor.

With more detailed reference to the drawing, the numeral 1 designates generally a tractor on which a cotton stripper unit, designated generally by the numeral 2, is mounted, which cotton stripper unit has an overhead cotton-receiving basket 4, which is shown in dashed outline, to receive the bolls being stripped from the cotton stalks.

The tractor 1 has the usual hydraulic controls which are utilized in conjunction with the invention, but which are not shown, as the manner of operation of such controls is well known in the art of operating attachments on farm tractors.

The numeral 6 designates the row unit of the cotton stripper, which unit is connected, at the forward end, through links to a lever 20 on a transverse rock shaft 7, which cotton stripper row unit is pivotally supported at the rear of the tractor, to enable the raising and lowering of the cotton stripper row unit by hydraulic means; however, the hydraulic means, as in general use of raising and lowering the cotton stripper row unit, is not sufficiently sensitive to irregularities in the terrain to prevent the forward end of the stripping unit from digging into the irregular terrain.

A plate or shoe 10 is mounted on the forward lower side of the cotton stripper row unit and is angulated, as indicated in FIG. 4, so the irregularity of the terrain will cause the plate to life the cotton stripper row unit, however, the cotton stripper row unit is connected in substantially balanced relation, through a tensioning spring 12, so as to actuate a pivoted control lever 14, which lever 14 is actuated by an elongated member 16, which member attaches to the hydraulically actuated lift arm 9.

The cotton stripper row unit 6 is so counterbalanced, by spring 12, that, when the shoes 10 engage the surface of the ground, the shoes will skim along on the top of the ground at an upturned angle, as will best be seen in FIG. 4, which will prevent pickup fingers 18 from digging into the surface of the ground G, but will still permit the pickup fingers to direct the cotton stalks and bolls upward and inward between the spaced-apart sides of each cotton stripper row unit 6. In this manner, the lower branches of the cotton and also the cotton stalks on the ground, are directed inward between the spaced apart sides of the respective cotton stripper row units. A cotton stripper row unit is usually positioned on each side of the tractor and the rocker shaft 7 extends beneath the tractor and is journaled thereto, so that the arms 8 and 20, which are attached thereto, and to the respective cotton stripper row units, will cause movement of the cotton stripper row units to a predetermined normal setting in accordance with the setting of the hydraulic control lever 22 mounted on the tractor 1.

Figure 2:
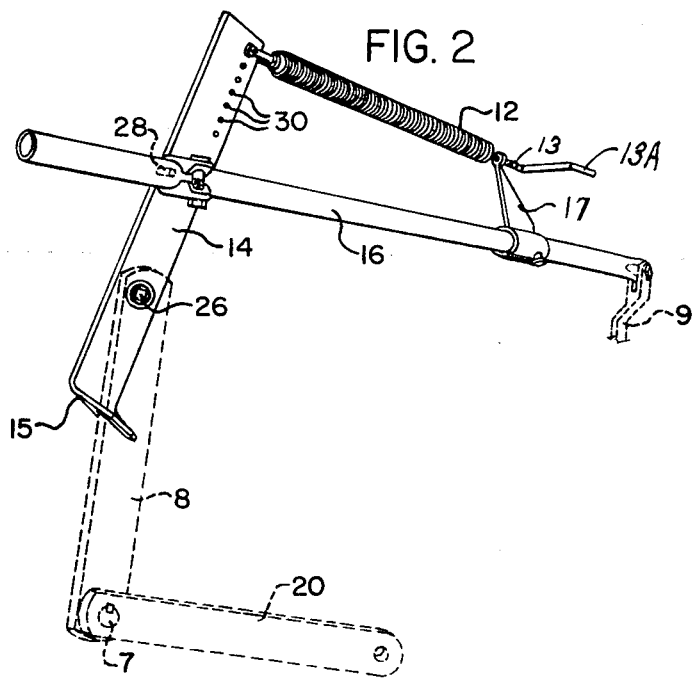
FIG. 2 is an enlarged, fragmentary, perspective view of the tensioning mechanism, lever and bar, the associated lift levers of the tractor being shown in dashed outline.

The innermost portion of each cotton stripper row unit 6 is apertured to receive a pivot pin 24 therethrough and through the respective adjustable linkage 21, each which linkage is pivotally mounted on the respective levers 20, which are secured to the front rockshaft 7, so, upon movement of the lever 8 which is secured to the rockshaft 7, the row unit on each side of the tractor 1 may be raised or lowered by the hydraulic control lever 22, and since the rear portion of the cotton stripper row unit 6 is pivotally connected to tractor 1 in a conventional manner, so that the entire row unit is raised or lowered and set at a normal operating level, however, the lever 14 pivotally connects to lever 8 by a pivot pin 26 and the lever 14 pivotally connects to the elongated member 16 by a pivot member 28, with the spring 12 being connected in one of the holes 30 in lever 14, on the opposite side of pivot member 28 from pivot pin 26. The lever 14 is out-turned, as indicated at 15, and is notched, as will best be seen in FIGS. 1 and 2, so that the notched portion will complementally engage lever 8. Upon raising either end of the cotton stripper row units 6, the tensioned spring 12 is adjusted by a screw-threaded rod 13, which rod 13 engages an outstanding lug 17 which is adjustably secured to elongated member 16. The screw-threaded rod 13 has a crank 13A thereon, which enables the tensioning of spring 12 until the cotton stripper row units 6, attached thereto, will be counterbalanced to just skim the terrain or to "float," and if either of the cotton stripper row units 6 hits a high place or an obstruction, the lever 20 will move upward to cause lever 8 to move away from the outturned portion 15 of lever 14, whereupon, the longitudinal lift member 16 will seek its normal position by movement of the hydraulically actuated implement lift arm 9.

The shoes 10 are pivotally connected to the lower side of the respective portions of the cotton stripper row unit 6 to enable the shifting of the angle on the forward side of the cotton stripper row units 6, so as to engage the ground at the correct angle, as will best be seen in FIGS. 4 and 5. The shoes 10 are adjustable laterally, and are also adapted to fit various model tractors, as will best be seen in FIG. 6. Each shoe has an upturned lip 11 along the adjacent inner sides thereof to guide the cotton stalk between adjacent sides of the respective cotton stripper row units.

MODIFIED FORM OF PLATE OR SHOE

A modified form of plate or shoe 41, for the cotton stripper row unit 6, is shown in FIGS. 7 through 9, which form of plate or shoe is particularly adapted to tight or firm soil, and is adapted to fit on a modified form of cotton stripper row unit 6, for this type of soil. The shoe 41 has an upstanding lug 42 secured thereto, which bolts onto the cotton stripper row unit 6 and is adjustable by bolts 46 passing through slots 44 and through an aperture in the cotton stripper row unit, as shown in FIG. 7. These shoes are secured in adjusted relation by bolts 46. A finger 48 extends inwardly and engages a plate 50 on the modified form of cotton stripper row unit 6, as shown in FIGS. 7 and 8. This form of shoe is not hinged, but utilizes the slots to obtain the correct operating angle to glide over tight or firm soil, as shown in FIG. 7.

Having thus clearly shown and described the invention, what is claimed as new and desired to be secured by Letters Patent is:

1. A self-positioning, balanced row unit for cotton strippers, which row unit comprises in combination with a tractor having an implement lift arm and a cotton stripper having a pair of spaced-apart, upright members forming a cotton stripper row unit;
   a. a plate forming a shoe which is detachable secured on the lower end of each said spaced-apart, upright members forming the row units.
      1. said plate being selectively angulated so that the rear end thereof will normally engage the terrain when moved thereover,
   b. a rockshaft journaled to the tractor and extending therebelow and transversely thereof with first upstanding lever being secured thereto,
      1. a second upstanding lever pivotally secured to said first upstanding lever intermediate the length thereof,
      2. said second upstanding lever extending downwardly along said first upstanding lever for a portion of the length thereof,
      3. said second upstanding lever having a notch formed therein near the lower end thereof, which second lever is inturned and the notch therein complementally engages said first lever when in one position,
      4. an outwardly extending lever secured to said rockshaft,
      5. connecting means between said outwardly extending lever and said row unit,
   c. an elongated member pivotally attached to the implement lift arm of the tractor and extending forwardly thereof,
      1. a pivot member secured to the elongated member,
      2. said second lever being pivotally mounted on said pivot member intermediate the length of said second lever,
   d. screw-threaded lug means secured to the elongated member a spaced distance from said pivot member,
      1. fitted within said lug means,
   e. said second upstanding lever having spring connecting means thereon positioned outwardly from said first upstanding lever,
      1. a spring connected to and extending between said spring-connecting means on said second upstanding lever and said screw-threaded adjusting means in said lug means, said spring counterbalancing said row units to allow the row units to skim over the terrain.

2. A cotton stripper row unit as defined in claim 1; wherein
   a. said shoe is mounted on said cotton stripper row unit for movement therewith about a horizontal axis to vary the angularity of said shoe with respect to the terrain.

3. A cotton stripper row unit as defined in claim 1; wherein
   a. the forward end of said shoe has a downturned finger secured thereon to move the cotton stalks upward as the cotton stripper moves over the terrain.

4. A cotton stripper row unit as defined in claim 1; wherein
   a. said shoe has slots formed therein to enable the adjustment thereof transversely with respect to the row unit of the cotton stripper, and
   b. an upstanding lug is mounted on said shoe,
      1. said lug having a vertical slot formed therein to enable the shoe to be adjusted vertically with respect to the terrain.

5. A cotton stripper row unit as defined in claim 1; wherein
   a. said spring which extends between said screw-threaded lug means on said elongated member and said spring connecting means on said second upstanding lever is a tension spring.

6. A cotton stripper row unit as defined in claim 5; wherein
   a. Said second upstanding lever has spaced-apart apertures formed therein along the upper portion thereof which forms said spring-connecting means to vary the pull exerted by said spring on said second upstanding lever.

7. A self-positioning, balanced row unit for cotton strippers, which row unit comprises in combination with a tractor having an implement lift arm and a cotton stripper having a pair of spaced-apart, upright members forming a cotton stripper row unit;
   a. a rockshaft journaled on the tractor and extending therebelow and transversely thereof with a first upstanding lever being secured thereto,
      1. an outwardly extending lever secured to said rockshaft,
      2. a second upstanding lever pivotally secured to said first upstanding lever intermediate the length thereof,
      3. said second upstanding lever extending downwardly along said first upstanding lever for a portion of the length thereof,
      4. said second upstanding lever having an abutment thereon near the lower end thereof, which second lever complementally engages said first lever when in one position,
   b. an elongated member pivotally attached to the implement lift arm of the tractor and extending forwardly thereof,
      1. a pivot member secured to the elongated member,
      2. said second upstanding lever being pivotally mounted on said second pivot member intermediate the length of said lever,
   c. connecting means between said outwardly extending lever on said rockshaft and the cotton stripper row unit to lift said row unit,
   d. an angulated plate forming a shoe which is detachably secured on the lower end of each said spaced-apart, upright members forming the row units,
   e. lug means secured to the elongated member a spaced distance from said pivot member,
      1. a spring adjusting member fitted on said lug means,
   f. said second upstanding lever having spring connecting means thereon positioned outwardly from said first upstanding lever, and
      1. a spring connected to and extending between said spring connecting means on said second upstanding lever and said spring adjusting member on said lug means, said spring counterbalancing said row unit to allow the row unit to skim over the terrain.

* * * * *